United States Patent [19]

Musschoot et al.

[11] 3,712,459
[45] Jan. 23, 1973

[54] VIBRATORY CONVEYOR
[75] Inventors: Albert Musschoot; Richard B. Kraus, both of Barrington, Ill.
[73] Assignee: General Kinematics Corporation
[22] Filed: Feb. 12, 1971
[21] Appl. No.: 114,892

[52] U.S. Cl. .............................................198/220 A
[51] Int. Cl. ..............................................B65g 27/00
[58] Field of Search ....198/220 A, 220 DA; 209/325; 221/236, 238, 160, 159

[56] References Cited

UNITED STATES PATENTS

| 3,063,543 | 11/1962 | Schneider | 221/159 X |
|---|---|---|---|
| 2,972,433 | 2/1961 | Knoche | 221/160 |
| 2,333,338 | 11/1943 | Rapp | 198/220 A |
| 3,534,849 | 10/1970 | Powell et al. | 198/220 A |
| 3,547,252 | 12/1970 | Brown et al. | 198/220 DA |

Primary Examiner—Richard E. Aegerter
Assistant Examiner—H. S. Lane
Attorney—Hofgren, Wegner, Allen, Stellman & McCord

[57] ABSTRACT

A vibratory conveyor arranged for conveying material in one or more directions and arranged for selective throwing of the material as for cooling the same prior to the conveying operation. The means for vibrating the conveyor is arranged to utilize different portions thereof jointly in different combinations to effect the selective conveying and throwing operations.

13 Claims, 6 Drawing Figures

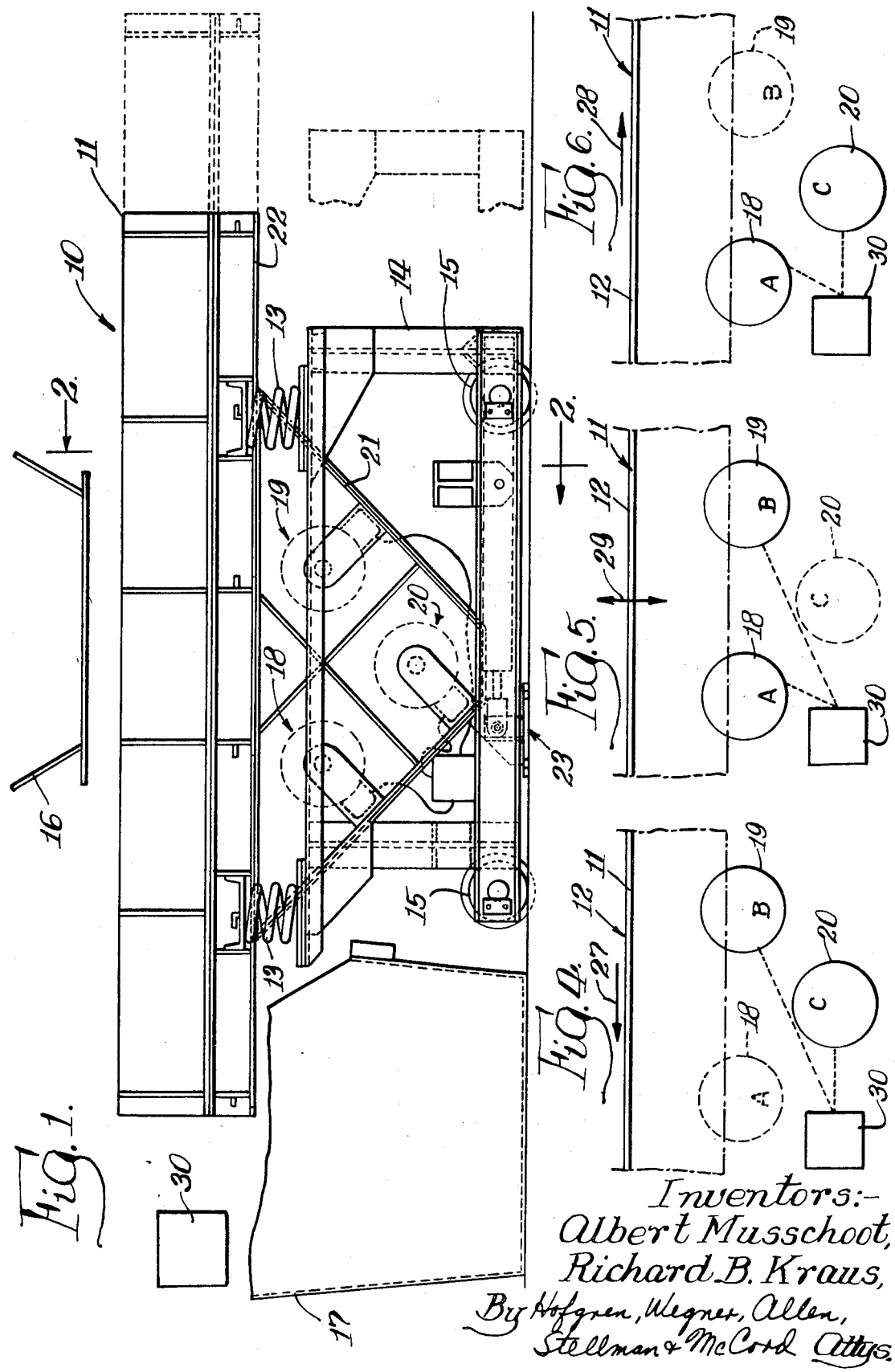

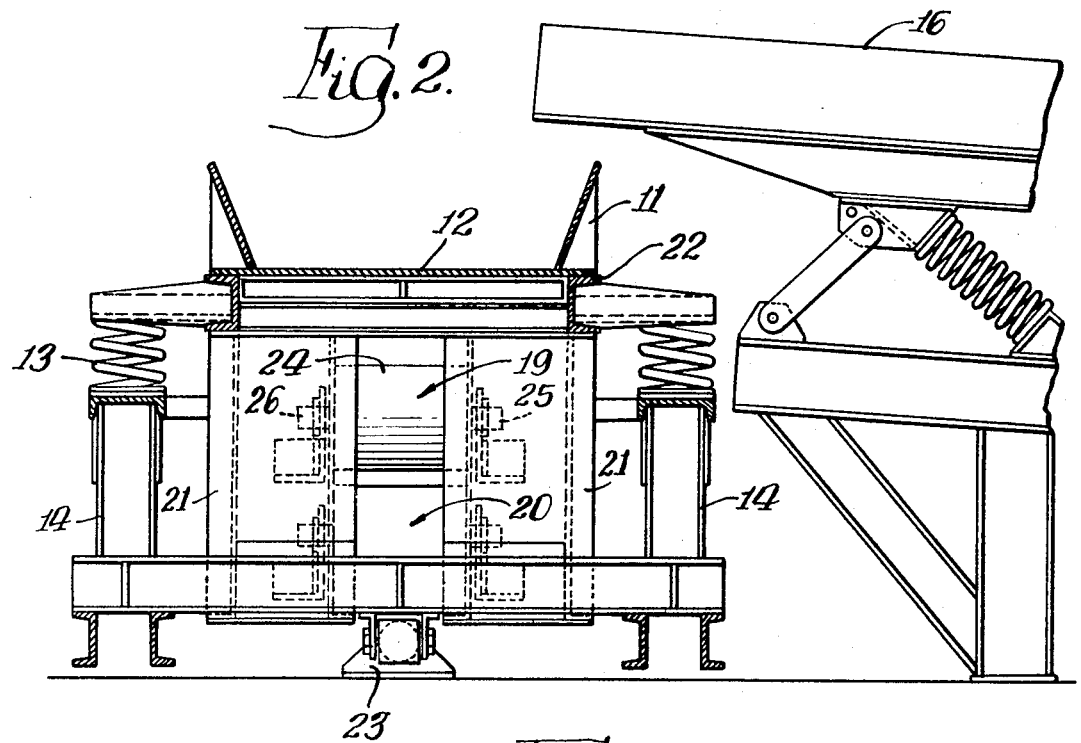
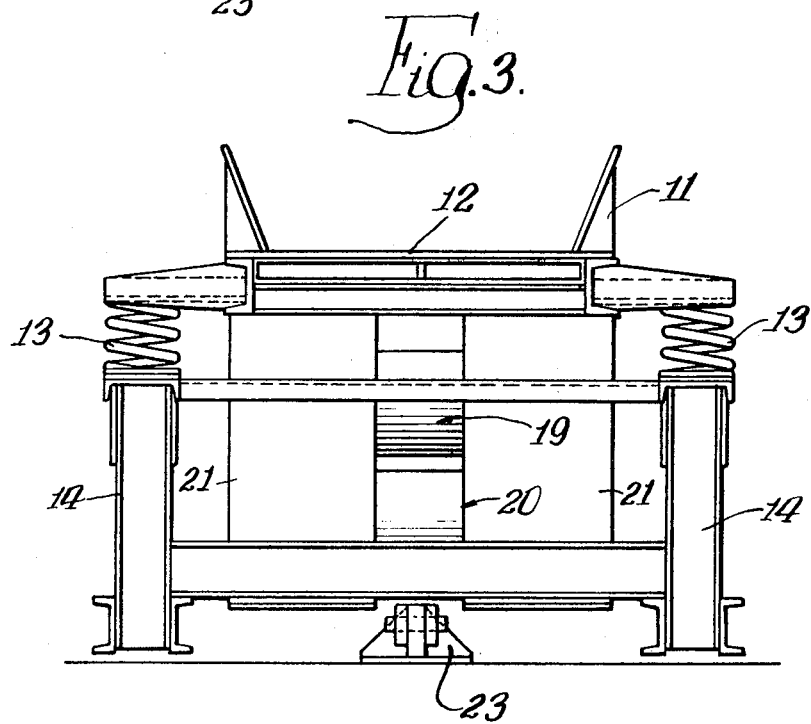

VIBRATORY CONVEYOR

BACKGROUND OF THE INVENTION

1. Field of the Invention

This invention relates to vibratory devices, and particularly to vibratory conveyors.

2. Description of the Prior Art

In conventional vibratory conveyors a material-carrying member is vibrated suitably to cause movement of the material along an upper surface thereof. The known devices may be selectively operated to provide movement in different directions, such as in opposite directions, by selective control of the vibrating means.

Where the material to be conveyed comprises hot objects such as castings, it is desirable to provide means for cooling the castings before conveying them to the desired delivery point. Apparatus for effecting such cooling of the castings has heretofore been provided separate from the vibratory conveyor means, and thus has necessitated increased cost over the cost of the vibratory conveyor.

SUMMARY OF THE INVENTION

The present invention comprehends an improved vibratory conveyor including first, second and third means for vibrating the material-carrying member. The vibrating means are arranged so that when the first and second vibrating means are concurrently operated, they cause movement of the material in a first preselected direction along the surface of the material-carrying member. When the second and third vibrating means are concurrently operated, they cause movement of the material in a second preselected direction along the material-carrying member surface. When the first and third vibrating means are concurrently operated, they cause movement of the material in a third preselected direction, which may comprise a throwing of the material vertically seriatim to effect cooling thereof. Thus, where the material comprises hot objects such as castings, the conveyor may be operated to firstly throw the castings to effect cooling thereof. The cooled castings may then be delivered in the desired one of the different directions of conveying by the apparatus to deliver the cooled castings to the desired delivery point.

Thus, the first, second and third vibrating means may comprise three substantially similar vibratory drives which may provide vibratory force to the material-carrying member having a first component parallel to the surface thereof, and a second component directed upwardly relative to the surface.

BRIEF DESCRIPTION OF THE DRAWING

Other features and advantages of the invention will be apparent from the following description taken in connection with the accompanying drawing, wherein:

FIG. 1 is a fragmentary side elevation of the vibratory conveyor embodying the invention;

FIG. 2 is a vertical section taken substantially along the line 2—2 of FIG. 1;

FIG. 3 is an end elevation thereof;

FIG. 4 is a schematic diagram illustrating the arrangement of the vibratory drives to effect movement of the material in a first preselected direction;

FIG. 5 is a schematic diagram illustrating the arrangement of the vibratory drives to effect vertical throwing of the material; and FIG. 6 is a schematic diagram illustrating the arrangement of the vibratory drives to effect movement of the material in a second, opposite direction.

DESCRIPTION OF THE PREFERRED EMBODIMENT

In the exemplary embodiment of the invention as disclosed in the drawing, a vibratory conveyor generally designated 10 is shown to comprise a trough 11 defining an upper material-carrying surface 12. Trough 11 is carried on suitable resilient means such as springs 13, for suitable movement to effect a vibratory conveying of material along the surface 12. Resilient mounting means 13 are supported on a base 14, which may be provided with suitable wheels 15 for selective positioning of the conveyor relative to a delivery, or feeder, apparatus 16 and a receiver 17. As shown, the feeder 16 may extend to over the trough surface 12, and the receiver 17 may be disposed at one end of the conveyor for delivery of the material downwardly thereinto.

The means for vibrating trough 11 herein comprises first, second and third vibratory drives generally designated, respectively, 18, 19 and 20, which are carried on a suitable wall means 21, in turn secured to the base portion 22 of trough 11. During operation of the conveyor by the drive means 18, 19, and 20, the conveyor may be retained against movement on wheels 15 by a suitable retaining pad device 23.

Vibratory drive means may comprise well known motor driven eccentrics. An excellent example of such a vibratory drive is that shown in Musschoot et al. U.S. Pat. No. 3,089,582, owned by the assignee hereof. Briefly, such eccentric drives include a drive motor 24 and a pair of rotating eccentric weights 25 and 26 carried on the opposite shaft extensions of the motor. Forces generated by the rotating weights acting on the conveyor trough 11 include a first horizontal component parallel to the surface 12 and a second vertical component perpendicular thereto. Springs 13 cooperate with the vibratory drive means to cause the resultant movement of trough 11 to effect a substantially straight line movement of the trough 11 and base portion 22.

The present invention comprehends utilization of three such eccentric vibratory drives located, as seen in FIG. 1, at the apices of an inverted triangular configuration wherein drives 18 and 19 define the upwardly disposed base of the triangular configuration, and drive 20 defines the downwardly directed apex.

Operation of the vibratory drives is effective selectively by suitable electrical control means schematically shown at 30 to energize motors 24 thereof selectively to provide three different modes of movement of the material on trough surface 12. As seen in the schematic diagram of FIG. 4, energization of the drive motors to operate vibratory drives 19 and 20 effects a movement of the conveyor suitable to convey the material in the direction of arrow 27 (or to the left as shown therein).

As shown in FIG. 6, energization of drive motors 24 to effect operation of vibratory drives 18 and 20 causes vibration of the trough 11 to move material on the surface 12 in a second direction as shown by arrow 28, which, in the illustrated embodiment, is opposite to direction 27 (or to the right as shown therein).

Energization of drive motors 24 to effect operation of vibratory drives 18 and 19 causes vertical reciprocation of the trough 11 as shown by arrows 29 in FIG. 5.

The operation of vibratory conveyor 10 is extremely simple. The material to be conveyed is delivered onto trough surface 12, as from delivery apparatus 16. Illustratively, where the material to be conveyed comprises hot objects such as metal castings, the conveyor may be firstly utilized to cool the castings by a seriatim throwing of the castings upwardly from the trough surface 12 to expose all surfaces of the castings to the cooling influence of the ambient atmosphere, and thereby efficiently effect the desired temperature reduction. This throwing action is effected by energization of drives 18 and 19 concurrently, as discussed above.

Upon completion of the cooling operation, the operator may then deliver the cooled objects to the desired receiver. If the receiver is disposed at the right-hand end of the conveyor, the operator selectively energizes motors 24 to operate drives 18 and 20 for effecting the movement of the material along surface 12 to the right as shown in FIG. 6. Where the receiver 17 is disposed at the left-hand end of the conveyor, as shown in FIG. 1, the operator energizes motors 24 to operate drives 19 and 20 concurrently thereby to move the material along the trough surface 12 to the left in the direction of arrow 27 as shown in FIG. 4.

Thus, the vibrating means of conveyor 10 comprises first and second vibratory drives cooperatively arranged to cause movement of the material to be conveyed in a first preselected direction along the surface 12. The vibrating means further comprises a third vibratory drive cooperatively arranged with the second drive to cause movement of the material in a second direction along the surface 12 which herein comprises an opposite direction. The first and third vibratory drives are cooperatively arranged to cause movement of the material in a third preselected direction, herein vertically.

The foregoing disclosure of specific embodiments is illustrative of the broad inventive concepts comprehended by the invention.

I claim:

1. In a vibratory conveyor having a material-carrying member provided with an upper material-carrying surface, and means for movably supporting said material-carrying member for vibratory movement, apparatus for selectively vibrating said material-carrying member comprising: first, second and third means for vibrating said material-carrying member, said first and second vibrating means being cooperatively arranged when concurrently operated to cause movement of the material in a first preselected direction along said upper surface, said second and third vibrating means being cooperatively arranged when concurrently operated to cause movement of the material in a second preselected direction along said upper surface, and said first and third vibrating means being cooperatively arranged to cause movement of the material in a third preselected direction, and means for selectively operating said vibrating means in said different concurrent modes of operation.

2. The vibratory conveyor of claim 1 wherein said second preselected direction is opposite to said first preselected direction.

3. The vibratory conveyor of claim 1 wherein said third direction is transverse to the plane defined by said first and second directions.

4. The vibratory conveyor of claim 1 wherein said third direction is perpendicular to the plane defined by said first and second directions.

5. The vibratory conveyor of claim 1 wherein each said vibrating means comprises a rotary eccentric device.

6. The vibratory conveyor of claim 1 wherein said vibrating means are disposed at the apices of a triangle.

7. The vibrating conveyor of claim 1 wherein said vibrating means are disposed at the apices of a triangle having its base parallel to the plane defined by said first and second directions.

8. The vibratory conveyor of claim 1 wherein said vibrating means provides a force acting on said material-carrying member having a first component parallel to the plane defined by said first and second directions, and a second component transverse thereto.

9. A vibratory conveyor for handling hot objects comprising: first means for effecting seriatim primarily vertical throwing of the objects to cool the objects; second means including a portion of said first means for conveying the cooled objects in a preselected lateral direction; and control means for selectively controlling said first and second means for first effecting a repeated upward throwing of the objects a desired number of times without lateral conveying thereof and subsequently effecting the lateral conveying of the objects.

10. The vibratory conveyor of claim 9 further including third means including a portion of said first means for conveying the objects in another preselected lateral direction, said control means including means for selectively operating with said second or third conveying means to effect said conveying of the objects selectively in either of said preselected lateral directions.

11. A vibratory conveyor for handling hot objects comprising: first means for effecting seriatim vertical throwing of the objects to cool the objects; second means including a portion of said first means for conveying the cooled objects in a selected direction; and third means including a portion of said first means for conveying the cooled objects in another preselected direction, said first, second, and third means comprising three substantially similar vibratory drives.

12. In a vibratory conveyor having a material-carrying member provided with an upper-material-carrying surface, and means for movably supporting said material-carrying member for vibratory movement, apparatus for selectively vibrating said material-carrying member comprising:

first, second and third means for vibrating said material-carrying member, said first and second vibrating means being cooperatively arranged when concurrently operated to cause movement of the material in a first preselected direction along said upper surface, said second and third vibrating means being cooperatively arranged when concurrently operated to cause movement of the material in a second preselected direction along said upper surface; and means for selectively operating said vibrating means in said different concurrent modes of operation.

13. The vibratory conveyor of claim 12 wherein said second preselected direction is opposite to said first preselected direction.

* * * * *